(12) United States Patent
Richards

(10) Patent No.: US 10,506,594 B2
(45) Date of Patent: Dec. 10, 2019

(54) TIME MULTIPLEXING COMMUNICATION WITH SECONDARY CELLS

(71) Applicant: Telefonaktiebolaget LM Ericsson (publ), Stockholm (SE)

(72) Inventor: Christopher Richards, Ottawa (CA)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 29 days.

(21) Appl. No.: 15/547,614

(22) PCT Filed: Feb. 5, 2016

(86) PCT No.: PCT/IB2016/050614
§ 371 (c)(1),
(2) Date: Jul. 31, 2017

(87) PCT Pub. No.: WO2016/125121
PCT Pub. Date: Aug. 11, 2016

(65) Prior Publication Data
US 2018/0343663 A1     Nov. 29, 2018

Related U.S. Application Data

(60) Provisional application No. 62/112,295, filed on Feb. 5, 2015.

(51) Int. Cl.
*H04W 72/04* (2009.01)
*H04W 72/12* (2009.01)
(Continued)

(52) U.S. Cl.
CPC ... *H04W 72/0453* (2013.01); *H04W 28/0278* (2013.01); *H04W 72/0486* (2013.01);
(Continued)

(58) Field of Classification Search
CPC ......... H04W 72/0453; H04W 72/0486; H04W 72/1215; H04W 76/27; H04W 76/28; H04W 28/0278
See application file for complete search history.

(56) References Cited

U.S. PATENT DOCUMENTS

| | | |
|---|---|---|
| 2012/0307744 A1 | 12/2012 | Charbit et al. |
| 2012/0307869 A1 | 12/2012 | Charbit et al. |

(Continued)

FOREIGN PATENT DOCUMENTS

| | | |
|---|---|---|
| JP | 2009-159326 A | 7/2009 |
| WO | 2013/112983 A2 | 8/2013 |
| WO | 2014/007156 A1 | 6/2016 |

OTHER PUBLICATIONS

Korean Notice of Preliminary Rejection and English translation of same dated Sep. 18, 2018 issued in corresponding Korean Application No. 10-2017-7024929 consisting of 7 pages.

(Continued)

*Primary Examiner* — Gary Mui
(74) *Attorney, Agent, or Firm* — Christopher & Weisberg, P.A.

(57) ABSTRACT

A method implemented by a network node of a cellular communication network serving a plurality of user devices is disclosed. The method comprises determining a transmission routine for each of a plurality of secondary cells (SCells) using radio channels in an unlicensed spectrum. Each transmission routine has an associated transmission period based on a downlink (DL) buffer status. The method also comprises time multiplexing transmission from the plurality of SCells to the plurality of user devices by executing the transmission routines for their respective time periods. Network nodes, apparatus, computer programs associated with the method are also disclosed.

24 Claims, 9 Drawing Sheets

(51) Int. Cl.
  *H04W 76/28* (2018.01)
  *H04W 76/27* (2018.01)
  *H04W 28/02* (2009.01)
  *H04W 72/08* (2009.01)
  *H04W 16/14* (2009.01)

(52) U.S. Cl.
  CPC ....... *H04W 72/1215* (2013.01); *H04W 76/27* (2018.02); *H04W 76/28* (2018.02); *H04W 16/14* (2013.01); *H04W 72/082* (2013.01)

(56) References Cited

U.S. PATENT DOCUMENTS

| | | | |
|---|---|---|---|
| 2013/0201884 A1 | 8/2013 | Freda et al. | |
| 2014/0044105 A1* | 2/2014 | Bontu | H04L 5/001 370/336 |
| 2014/0177500 A1 | 6/2014 | Han et al. | |
| 2014/0233542 A1* | 8/2014 | Bergstrom | H04L 5/0085 370/336 |
| 2015/0078261 A1* | 3/2015 | Yu | H04W 72/0453 370/329 |
| 2015/0085792 A1* | 3/2015 | Reddy | H04L 5/0098 370/329 |
| 2015/0085841 A1* | 3/2015 | Sadek | H04W 72/1215 370/336 |
| 2015/0156775 A1 | 6/2015 | Ishikawa et al. | |
| 2016/0050690 A1* | 2/2016 | Yun | H04W 16/14 370/329 |
| 2016/0066195 A1* | 3/2016 | Moon | H04W 16/14 455/454 |
| 2016/0112902 A1* | 4/2016 | Huh | H04W 28/0289 370/235 |
| 2016/0183293 A1* | 6/2016 | Lei | H04W 72/14 370/329 |
| 2016/0192396 A1* | 6/2016 | Ng | H04W 74/0808 370/329 |
| 2017/0303220 A1* | 10/2017 | Sadeghi | H04L 5/0053 |

OTHER PUBLICATIONS

International Search Report and Written Opinion dated Apr. 15, 2016 for International Application Serial No. PCT/IB2016/050614, International filing date Feb. 5, 2016, consisting of 11-pages.

European Examination Report dated Oct. 30, 2018 issued in corresponding European Application No. 16 705 823.9 consisting of 5 pages.

ETRI, "LAA Using LTE Deployment and Operational Scenarios"; Agenda Item: 7.3.2.4, Document for Discussion and Decision, Oct. 6-10, 2014; 3GPP TSG RAN WG1 Meeting #78bis, R1-143965, consisting of 7 pages.

Japanese Office Action and English Summary translation thereof, dated Oct. 9, 2018 issued in corresponding Japanese Application No. 2017-541233, consisting of 5 pages.

Japanese Notice of Allowance and English translation of same issued in corresponding Japanese Patent Application No. 2017-541233 dated Jan. 18, 2019, consisting of 6 pages.

ETRI 3GPP TSG RAN WG1 Meeting #78bis, R1-143965, Ljubljana, Slovenia, Oct. 6-10, 2014; Agenda Item: 7.3.2.4; Document for Discussion and Decision; LAA Using LTE Deployment and Operational Scenarios, consisting of 5 pages.

* cited by examiner

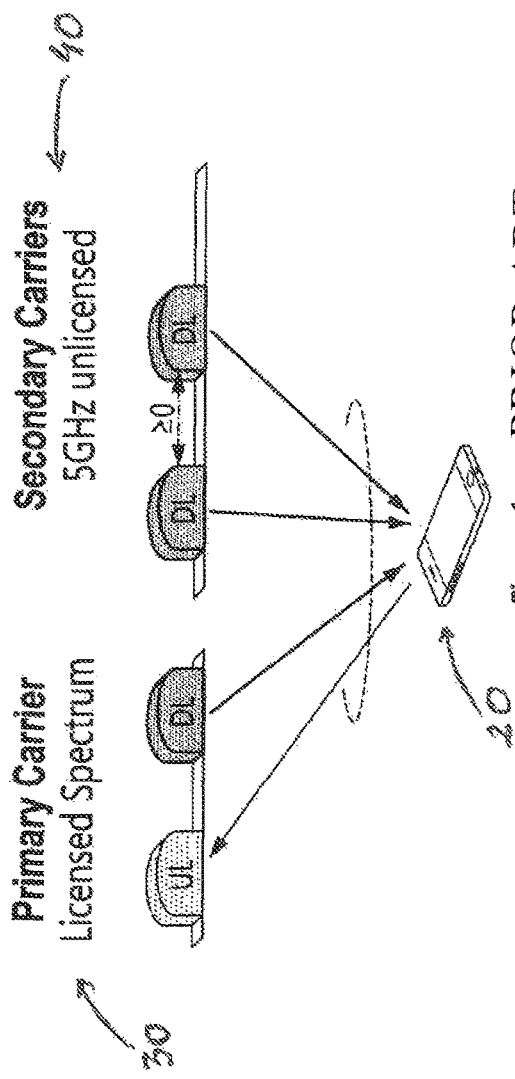

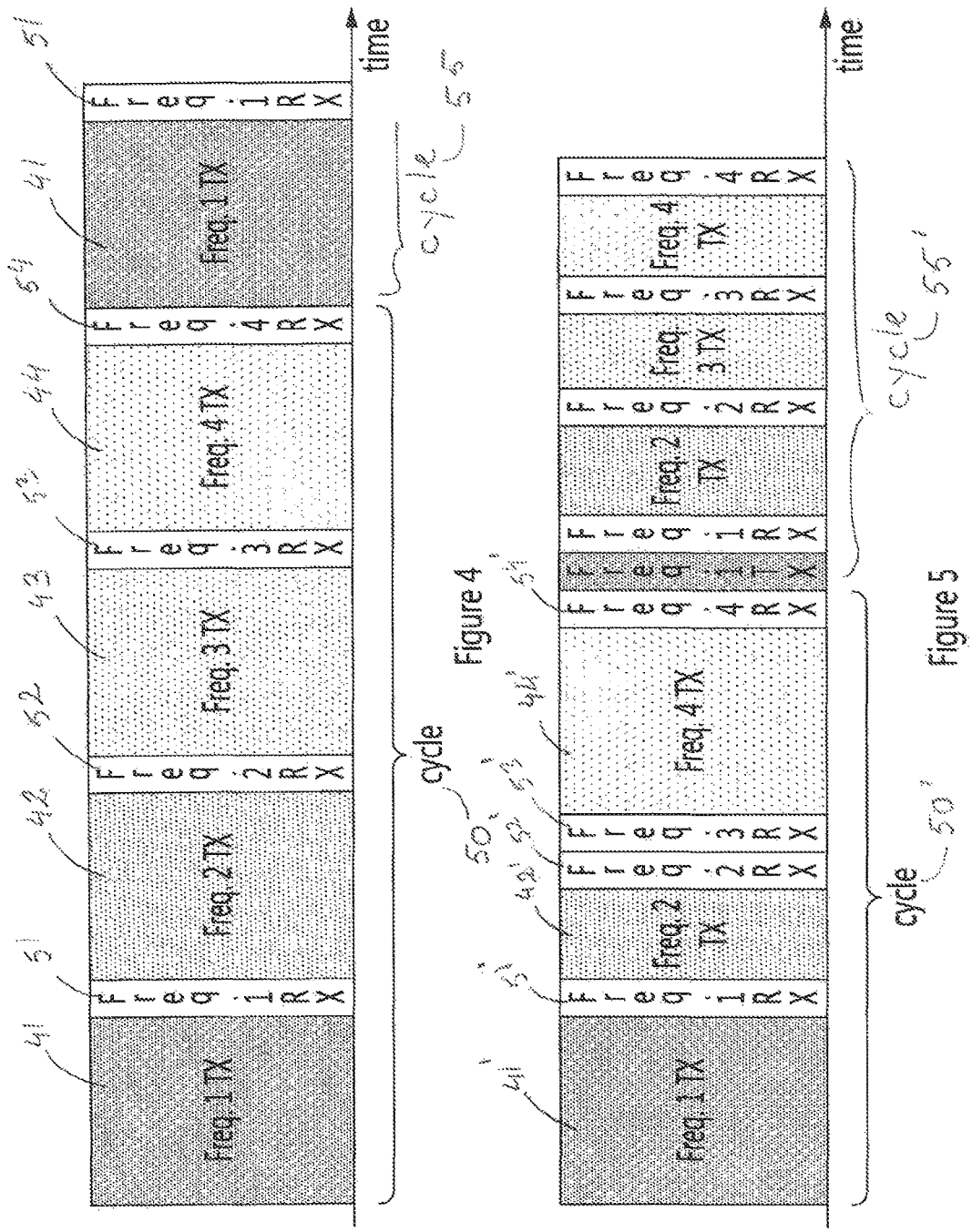

TIME MULTIPLEXING COMMUNICATION WITH SECONDARY CELLS

CROSS-REFERENCE TO RELATED APPLICATIONS

This application is a Submission Under 35 U.S.C. § 371 for U.S. National Stage Patent Application of International Application Number: PCT/IB2016/050614, filed Feb. 5, 2016 entitled "TIME MULTIPLEXING COMMUNICATION WITH SECONDARY CELLS," which claims priority to U.S. Provisional Application No. 62/112,295, filed Feb. 5, 2015 entitled "TIME MULTIPLEXING TRANSMISSIONS ON SECONDARY CELLS IN LAA-LTE," the entireties of both of which are incorporated herein by reference.

TECHNICAL FIELD

The present disclosure relates to cellular communication networks and in particular to communication with secondary cells (SCells) in such networks.

BACKGROUND

Wireless technologies require radio spectrum to operate. Radio spectrum is finite and highly regulated in all parts of the world. The increased usage of wireless devices is increasing the demand for additional spectrum to be used for wireless communications. As a result, radio spectrum is one of the most expensive resources for wireless communications operators.

New Long Term Evolution (LTE) technologies are being developed to make use of the unlicensed shared spectrum. The main goal for using LTE in unlicensed spectrum is to leverage the relatively large amount of unlicensed spectrum in order to provide a better mobile service. Some of these technologies are termed License Assisted LTE (LAA-LTE) or LTE Unlicensed (LTE-U). The initial focus for LAA-LTE is to use a small portion of the 5 GHz shared spectrum. In the USA and Canada, 250 MHz of spectrum is assigned for shared use in the 5 GHz bands.

Shared, or unlicensed spectrum, operates very differently compared to traditional licensed 3GPP spectrum. Users of unlicensed spectrum must share the spectrum resources with other users and other radio technologies, and do so in a fair way while at the same time ensuring that the spectrum is used as efficiently as possible.

Different technologies may use unlicensed spectrum simultaneously, e.g. By contrast, the LTE protocols and specifications have been developed on the premise that only LTE nodes operate in the same spectrum.

FIG. 1 illustrates a current cellular communication network configuration. LAA-LTE is used for illustration purpose. Within a cellular communication network, 5 GHz channels in the unlicensed spectrum are used as secondary component carriers 40 in a carrier aggregation configuration with a licensed LTE cell 30 (the Primary cell, PCell or Primary Carrier) for downlink (DL) transmission only to user devices 20. That is, the 5 GHz cells 40 are DL-only Secondary Cells (SCells) or Secondary Carriers. The uplink (UL) transmissions are sent using the PCell 30. It is noted that the notion DL-only secondary cells in the context of current LAA-LTE refers herein to the transmission of user data, but not all data, such as control data. It is noted that some control signals, as described in more detail below, are communicated from the SCells 40 to current LTE nodes. This aggregation of spectrum provides for a larger pipe with a more responsive user experience. By also maintaining a persistent anchor in the licensed spectrum to carry all of the control and signaling information, the user experience is more seamless and reliable.

One of the most significant changes being introduced for LAA-LTE is the requirement that an LAA-LTE base station, known as evolved Node B (eNB) periodically stops all transmissions in the unlicensed spectrum in order to allow other technologies to access the associated radio channel(s) and to perform measurements of other users of this (these) channel(s). This ON/OFF or discontinuous transmission (DTX) is in the order or tens to hundreds of milliseconds and may dynamically change based on demand and associated radio channel(s) usage.

In addition to the discontinuous transmission mechanism described above, there are many possible channels that may be utilized by an LAA-LTE eNB. For example, in the USA, the FCC has defined 3 5 GHz bands (termed the Unlicensed National Information Infrastructure bands, or UNII bands): UNII-1, UNII-2 and UNII-3/ISM (industrial, scientific and medical). Each of these bands covers several 20 MHz channels (4 in UNII-1, 16 in UNII-2 and 5 in the combined UNII-3/ISM band). These bands are illustrated in FIG. 2.

In order to communicate using SCells, SCell channel selection schemes are contemplated. There are several problems with the currently envisioned SCell channel selection schemes, leading to a need for improvements in cellular network communication using SCells.

SUMMARY

Among the currently envisioned SCell channel selection schemes, there are attempts to enable an LAA-LTE eNB to perform channel selection in order to use the "best" channel or channels from all the available 5 GHz SCell channels. These schemes may take a number of criteria into account, for example, select a channel that is not being used by any other devices, select a channel that is most lightly used, select a channel that is not being used by another LAA-LTE device, etc.

However, there are a number of problems with these approaches, including:

1) Channel usage is very dynamic and time variant.

2) Channel quality determination, including "best" channel determination, is done by the eNB. However, it would be preferable that the receivers of the transmissions at the user devices (e.g. user equipment (UE)) determine the channel quality and the "best" channel.

3) Channel quality is geographically localized. UEs in one area may perceive one channel as "best", while other UEs in another area of coverage perceive another channel as better.

Thus, selecting the "best" SCell channel or even multiple SCell channels is a difficult process, that needs to be repeated relatively frequently and is still likely to result in less than optimal performance. Furthermore, such SCell channel selection is done at the granularity of the eNB, that is: all UEs in the coverage area will utilize the same set of selected SCell channels.

The present disclosure provides systems and methods that seek to overcome at least some of the difficulties described above with the SCell channel selection procedure by using carrier aggregation while providing time multiplexing communication with SCells radio channels in the unlicensed spectrum. According to some embodiments of the present disclosure, a network node of a cellular network performs time multiplexing transmissions to user devices through potential SCells associated with a network node and operating in the unlicensed spectrum. Each of the potential SCells transmits sequentially data to user devices scheduled for downlink reception during a respective transmission period, according to a transmission routine. In particular, a set of potential SCells associated with the network node, execute in turn a respective SCell transmission routine for a respective transmission time. In this way, the communication between SCells and user devices is time multiplexed in a communication cycle.

In one aspect of the present disclosure, the network node:
(a) Determines whether a SCell within the set of potential SCells should transmit data to a set of mobile devices, and
(b) In response to determining that the SCell should transmit data to a set of mobile devices:
  (b1) turns on the transmitter for the SCell for an SCell transmission duration of time;
  (b2) turns off the transmitter for the SCell after the expiry of the SCell transmission period. In some embodiments, within the SCell transmission routine, the network node may also determines whether the SCell should be activated and activates the SCell in response to determining that the SCell should be activated.

Time multiplexing in the context of this disclosure comprises multiplexing respective SCell transmission routines for the SCells in the set of potential SCells. An SCell routine associated with a given SCell may be repeated within a communication cycle.

The communication cycle may also comprise performing reception routines during a reception period. In an SCell reception routine, the wireless nodes turns on the SCell receiver for an SCell receiver period. An SCell reception period may immediately follow the SCell transmission period for the same SCell or it may occur a later time, such as after some other SCell transmission routines or after all SCell transmission routines.

In yet further embodiments, the wireless network determines whether the SCell should be de-activated after the expiry of the SCell transmission duration of time and de-activates the SCell in response to determining that the SCell should be de-activated.

Using LTE as an example, an SCell time multiplexing procedure is as follows:
  An eNB radio unit transmits the first SCell on the radio channel associated with the first SCell by setting ON the transmitter for the SCell, for an associated transmission period after which the SCell transmitter is stopped and the user devices using that radio channel measure the channel quality;
  The eNB radio unit then moves to the next SCell radio channel, tunes the eNB radio unit to the new channel frequency associated with the next SCell, transmits for a transmission duration associated with the SCell currently considered, after which the current transmission stops and a reception period used to conduct receive measurements on the current SCell channel follows.
  The above steps are repeated for all the available/potential SCell channels in turn, eventually returning to the first SCell to repeat the process in a new communication cycle, also referred sometimes as a rotation, of the SCell time multiplexing procedure.

Not all SCells may need their transmission period in each rotation, but, preferably, the LAA SCells should have their reception period. For example, if there are no mobile devices (e.g. user equipment (UEs)) to receive data from a particular SCell and/or if a mobile device downlink (DL) data buffer, e.g. a UE DL data buffer, is below a defined threshold, that SCell transmission period may be skipped.

The SCell transmission periods do not need to be equal for all SCells or fixed from one communication cycle to another. For example an SCell that has a lot of data to transmit may transmit for a longer period than other SCells.

The receive period (or duration) for each SCell (i.e. the time that the eNB receives channel quality measurements from the user devices) may also be different for each SCell and may change from one rotation to another. However, even when the transmission period for a SCell is skipped, a minimal receive period is maintained.

In one aspect, a method implemented by a network node of a cellular communication network serving a plurality of user devices is provided. The method comprises determining a transmission routine for each of a plurality of SCells using radio channels in an unlicensed spectrum, each transmission routine having an associated transmission period based on a downlink (DL) buffer status. The method also comprises time multiplexing transmission from the plurality of SCells to plurality of user devices by executing the transmission routines for their respective transmission periods.

In one aspect, a communication cycle includes a sequence of the transmission routines for the plurality of SCells.

In one aspect, the method further comprises executing additional communication cycles based on the downlink buffer status.

In one aspect, each transmission periods ranges from zero to a maximum value, MAX_TX.

In one aspect, the associated transmission period for an SCell may change in a subsequent communication cycle.

In one aspect, the method further comprises determining a reception routine for each one of the plurality of SCells, each reception routine having an associated reception period and time multiplexing reception of data from the plurality of user devices to the plurality of SCells by executing the reception routines for their respective reception periods. In one aspect, each one of the reception periods are above a minimum value, MIN_RX.

In one aspect, the reception routine of a given SCell is performed after the transmission routine for the given SCell. In an alternate aspect, within a communication cycle, all SCell reception routines are performed after all transmission routines.

In one aspect, the method further comprises selecting a radio channel based on channel quality measurements obtained from the plurality of user devices, activating, the SCell during the associated transmission period of a communication cycle, and deactivating, the SCell during a remainder time of the communication cycle.

In one aspect, the radio channel is used for communication between the SCell and one or more user devices selected from the plurality of user devices based on channel quality measurements.

In one aspect, a network node within a cellular communication network is provided. The network node comprises a user interface circuit for communicating with one or more user devices and a processing circuit configured to performed steps of the method provided, in any of the aspects.

In one aspect, an apparatus is provided. The apparatus is, adapted to perform a method according to any one of the disclosed aspects.

In one aspect, a computer program is provided. The computer program comprises executable instructions that, when executed by a processing circuit in a network node of a cellular communication network, serving a plurality of user devices, causes the network node to perform a method according to any one of the disclosed aspects.

In one aspect, a computer program is provided. The computer program comprises executable instructions that, when executed by a processing circuit in network node of a cellular communication network, serving a plurality of user devices, causes the network node to perform a method according to any one of the disclosed aspects.

In one aspect, a carrier containing computer programs as disclosed, wherein the carrier is one of an electronic signal, optical signal, radio signal, or computer readable storage medium, is provided.

In one aspect, a non-transitory computer-readable storage medium, containing computer programs comprising executable instructions that, when executed by a processing circuit at a network node, causes the network node to perform a method according to any one of the disclosed aspects.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 1 illustrates communication within a Licensed Assisted Access (LAA) network;

FIG. 2 illustrates currently available USA 5 GHz UNII/ISM bands.

FIG. 4 illustrates a time multiplexing procedure through four SCells, in which each SCell transmission routine is immediately followed by an SCell reception routine, according to one embodiment of the present disclosure.

FIG. 5 illustrates a time multiplexing rotation through four SCells, in which in the SCell transmission duration and the SCell reception duration varies within each routine and the SCell transmission is not performed in certain SCell transmission routines, according to one embodiment of the present disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Before specifically describing embodiments of the present disclosure, a brief description of Carrier Aggregation (CA) in $3^{rd}$ Generation Partnership Project (3GPP) Long Term Evolution (LTE) and Licensed Assisted Access (LAA) to unlicensed spectrum using LTE is beneficial.

Carrier Aggregation (CA)

The LTE Release 10 (LTE Rel-10) standard supports bandwidths larger than 20 Megahertz (MHz). One important requirement on LTE Rel-10 is to assure backward compatibility with LTE Release 8 (LTE Rel-8). This should also include spectrum compatibility. That would imply that an LTE Rel-10 carrier, wider than 20 MHz, should appear as a number of LTE carriers to an LTE Rel-8 terminal. Each such carrier can be referred to as a Component Carrier (CC). In particular for early LTE Rel-10 deployments, it can be expected that there will be a smaller number of LTE Rel-10-capable terminals compared to many LTE legacy terminals. Therefore, it is necessary to assure an efficient use of a wide carrier also for legacy terminals, i.e., it is possible to implement carriers where legacy terminals can be scheduled in all parts of the wideband LTE Rel-10 carrier. The straightforward way to obtain this compatibility is by means of Carrier Aggregation (CA). CA implies that an LTE Rel-10 terminal can receive multiple CCs, where CCs have, or at least the possibility to have, the same structure as a LTE Rel-8 carrier. A CA-capable User Equipment (UE) is assigned a Primary Cell (PCell), which is always activated, and one or more Secondary Cells (SCells), which can be activated or deactivated dynamically.

The number of aggregated CCs as well as the bandwidth of the individual CC may be different for uplink and downlink. A symmetric configuration refers to the case where the number of CCs in downlink and uplink is the same whereas an asymmetric configuration refers to the case that the number of CCs is different. It is important to note that the number of CCs configured in a cell can be different from the number of CCs seen by a terminal. A terminal can for example support more downlink CCs than uplink CCs, even though the cell is configured with the same number of uplink and downlink CCs.

Figure 3:
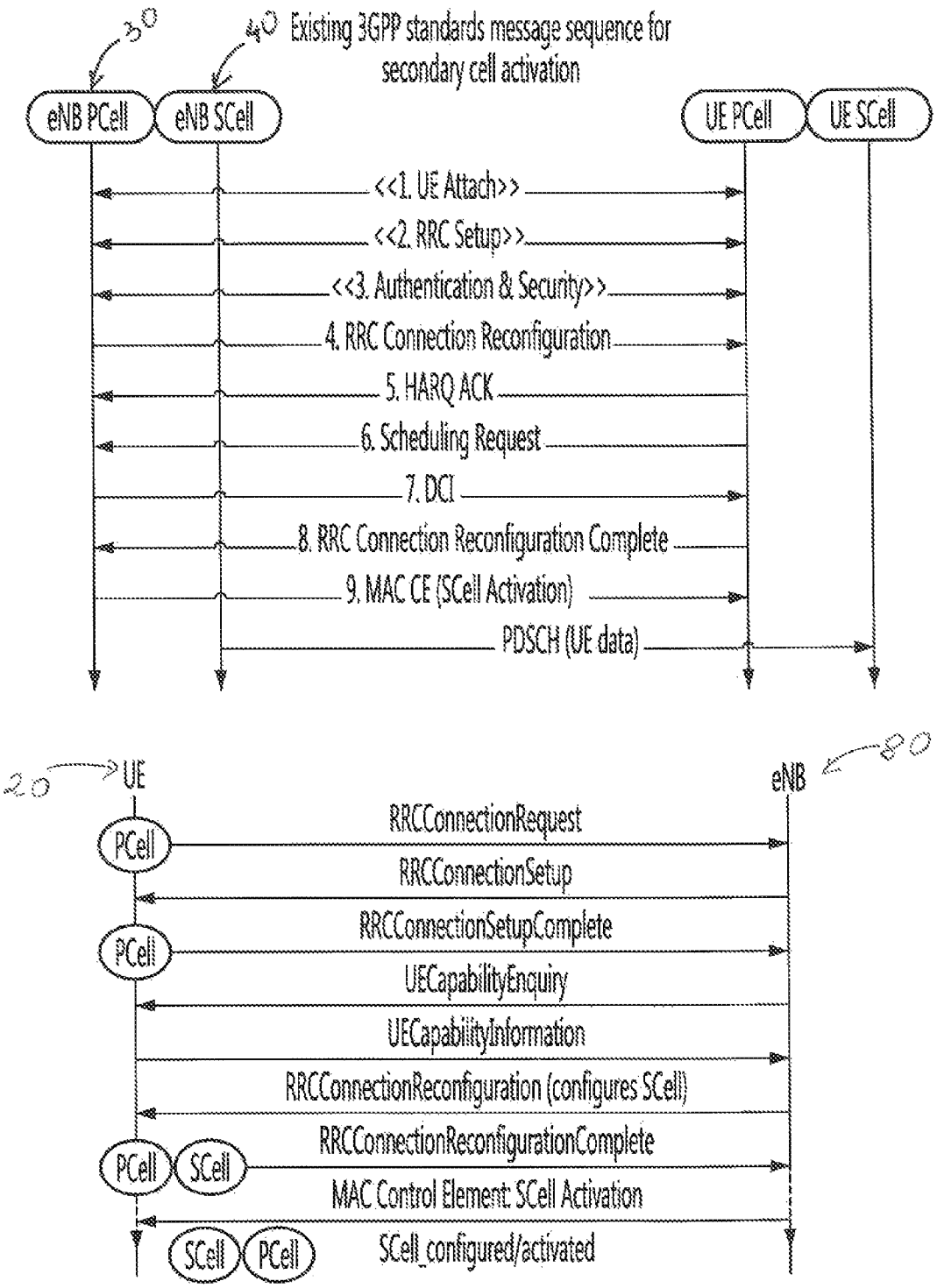
FIG. 3 illustrates existing 3GPP standard routine message for secondary cell activation.

FIG. 3 illustrates existing 3GPP standard routine message for secondary cell activation when CA is used, as in FIG. 1. A UE 20 is first connected to the LTE system (communication network) via the PCell 30. The network can then configure the UE 20 to aggregate a number of SCell(s) 40. The SCell 40 configuration is carried out via Radio Resource Control (RRC) signaling, which typically takes tens of ms. A configured SCell 40 can be operated into one of the two states: activated or deactivated. For an activated SCell, the UE will monitor the SCell in order to maintain time/frequency synchronization, monitor control channels, and report Channel Quality Information/Channel State Information (CQI/CSI) back to the network. For a deactivated SCell 40, the UE 20 will not monitor the SCell 40. The activation and deactivation commands are sent by Medium Access Control (MAC) elements and the UE can perform these commands quickly.

Licensed Assisted Access (LAA) to Unlicensed Spectrum Using LTE

Up to now, the spectrum used by LTE is dedicated to LTE. This has the advantage that LTE system does not need to care about the coexistence issue and thus spectrum efficiency can be maximized. However, unlicensed spectrum can, by definition, be simultaneously used/shared by multiple different technologies. To operate in the unlicensed band, LTE needs to consider the coexistence issue with other systems such as IEEE 802.11 (WiFi).

In the LAA framework, as shown in FIG. 1, a UE 20 is connected to the PCell 30 in the licensed band and one or more SCells 40 in the unlicensed band. In this disclosure, an SCell 40 operating in unlicensed spectrum, namely an LAA SCell, is referred in short as an SCell. Under the LAA framework, the PCell 30 retains the mobility and high-layer control, while the SCell 40 is geared towards serving the best effort user data. The PCell is supposed to also serve users when the unlicensed SCell 40 is unavailable.

Embodiments of Proposed Solutions

Difficulties with selecting the "best" LAA SCell channel have been noted above. A superior solution would be to configure LAA-LTE SCells 40 on all the available 5 GHz channels and then activate individual UEs 20 to use a subset of these SCells based upon channel quality feedback reports and measurements of each UE 20. This would allow channel selection to be performed at the granularity of the UE 20.

However, simultaneous configuration of all available SCells is impractical (and often impossible) since it requires that each 5 GHz radio unit of the LAA-LTE eNB be capable of operating so many cell carriers simultaneously. However, for example, the current generation of LTE eNB radio units are limited to supporting a small number of carriers, e.g. 4 cell carriers, which is far short of the 25 carriers that are available in the USA 5 GHz UNII/ISM bands.

The need to communicate via multiple SCells 40 is answered via embodiments described herein in which communications with the SCells 40 are multiplexed in time. The disclosed embodiments fit well with the discontinuous nature of the LAA-LTE and the DL-only nature of SCell communication.

During carrier aggregation, the primary cell (P-Cell) 30 undertakes work such as security, handovers and bearing of a physical uplink control channel and the SCells 40 performs the data transmission routine for the duration of the associated transmission period.

A user terminal 20 may be a wireless terminal or may be a wired terminal. The wireless terminal may refer to a device providing voice and/or data connectivity for a user, such as a mobile phone (or referred to as a "cellular" phone), a computer with a mobile terminal, and for example, may be a portable, pocket-sized, handheld, computer-embedded, or in-vehicle mobile apparatus, which exchanges voice and/or data with the radio access network. As well, the user terminal could be a personal communication service (PCS) phone, a cordless phone, a Session Initiation Protocol (SIP) phone, a personal digital assistant (PDA). The user terminal may also be referred to as a subscriber unit/station, a mobile station, a user equipment (UE), a user device.

A network node may refer for example to a device that communicates with a user terminal by using one or more sectors over an air interface on an access network. The network node may be a base station, or may also be an evolved base station (NodeB, eNB, or e-NodeB, evolved Node B), or a relay node or a remote radio head. As well, the terms network node, eNodeB, eNB, eNB radio unit may be used interchangeably within this disclosure. Furthermore, according to the present disclosure, component of a network node may be co-located at the same geographical location or may be distributed over multiple geographical locations.

In some embodiments, the cellular commutations network is a $3^{rd}$ Generation Partnership Project (3GPP) Long Term Evolution (LTE) network, the network node is an LTE node (e.g., an enhanced or evolved Node B (eNB)) and the mobile device is a user equipment (UE).

With respect to communication with user devices in secondary cells described herein, the terms SCells, SCell channels, SCell carriers may sometimes be used interchangeably in the present disclosure, to the degree that equivalency would be clear to a person skilled in the art. Furthermore, 'transmissions to/from SCells', and similar expressions may be understood to refer to transmissions to/from SCell carriers/radio channels/channel frequencies. Likewise, 'reception to/from SCells', and similar expressions may be understood to refer to receptions to/from SCell carriers/radio channels/channel frequencies.

Existing carrier aggregation configuration and activation/deactivation signaling procedures, including using standard UE measurements of the available SCells in order to determine the best SCell(s) for each UE as, for example, described in the 3GPP LTE standards, can be used.

The present disclosure provides systems and methods that seek to overcome at least some of the difficulties described above with the SCell radio channel selection procedure by providing time multiplexing transmissions to SCells of a cellular communications network. According to some embodiments of the present disclosure, a network node of a cellular network 1 performs time multiplexing transmissions to potential SCells associated with the node by time multiplexing transmission from a plurality of potential SCells. In particular, for a set of potential Cells associated with the network node, in an SCell transmission routine of a communication cycle, a network node:

(a) Determines whether a SCell 40 within the set of potential SCells 40 should transmit data to a set of mobile devices; and (b) In response to determining that the SCell 40 should transmit data to a set of mobile devices (b1) turns on the transmitter for the SCell 40 for an SCell 40 transmission duration of time;

(b2) turns off the transmitter for the SCell 40 after the expiry of the SCell transmission duration of time.

In some embodiments, the cellular commutations network is a $3^{rd}$ Generation Partnership Project (3GPP) Long Term Evolution (LTE) network, and the network node is an LTE node (e.g., an enhanced or evolved Node B (eNB)).

In some embodiments, within the SCell transmission routine the network node also determines whether the SCell should be activated and activates the SCell in response to determining that the SCell should be activated.

The time multiplexing rotation comprises respective SCell transmission routines for each one of the SCells in the set of potential SCells. An SCell routine associated with a given SCell may be repeated within a rotation.

The time multiplexing rotation may comprise respective SCell reception routines for some SCells in the set of potential SCells. In an SCell reception routine, the wireless nodes turns on the SCell receiver for an SCell receiver duration of time. An SCell receiver routine may immediately follow the SCell transmission period for the same SCell or it may occur a later point in time, such as after some other SCell transmission routines or after all SCell transmission routines.

In yet further embodiments, the wireless network also determines whether the SCell should be de-activated after the expiry of the SCell transmission duration of time and de-activates the SCell in response to determining that the first SCell should be de-activated.

In some embodiments, using LTE as an example, an SCell time multiplexing procedure is as follows:

An eNB radio unit transmits to the first SCell on the channel frequency associated with the first SCell by setting ON the transmitter for the SCell, for a transmission duration after which the SCell transmitter is stopped and the receiver measures that channel;

The eNB radio unit then moves to the next SCell channel, tunes the eNB radio unit to the new channel frequency associated with the next SCell, transmits for a transmission duration associated with the SCell currently considered, after which the current transmission terminates and a period to conduct receive measurements on the current SCell channel follows.

The above steps are repeated for all the available/potential SCell channels in turn, eventually returning to the first SCell to repeat the process in a new cycle or rotation of the SCell time multiplexing procedure.

Not all SCells may need their transmission period in each communication cycle (rotation). For example, if there are no mobile devices (e.g. user equipment (UEs)) activated for a particular SCell and/or if a user device downlink (DL) data buffer, e.g. a UE DL data buffer, is below a defined threshold, the SCell transmission may be skipped.

The SCell transmit durations do not need to be equal for all SCell or fixed from one rotation to another. For example an SCell that has a lot of data to transmit may transmit for a longer period than other SCells.

The receive duration for each SCell (i.e. the time that the eNB performs receive measurements) may also be different for each SCell and may change from one rotation to another. Preferably, even when the transmission period for a SCell is skipped, a minimal receive period is maintained.

According to one implementation, the following parameters could be defined and possibly configured by an operator:

MAX TX duration—common value for all potential SCells. Determines the maximum period that each SCell is transmitting in each communication cycle.

MIN RX duration—common value for all potential SCells. Determines the minimum period that each SCell is in receive mode in each communication cycle.

Using the MAX TX Duration and MIN RX duration the operator is able to determine a priori the maximum transmit and receive ratio for the SCells. E.g. 18:2 milliseconds provides a maximum TX duration of each SCell of 18 milliseconds and a minimum receive period of 2 milliseconds in each cycle. That ratio may be shared dynamically between multiple SCells or it may be used by a single SCell. This is illustrated in FIG. 4.

As shown above by way of an example, four SCell carriers (radio channels) are multiplexed in time by a network node. However, the number of carriers can be up to any number of carriers supported by the network node. In FIG. 4, the radio channels of four SCells 40 perform respective transmission routines, during a communication cycle 50, the transmission routines being denoted with 41, 42, 43, and 44. Each routine extends over an associate transmission period for downlink transmission of data to respective user devices. For example, during transmission routine 41, downlink data from the downlink buffer of a first SCell is transmitted to user devices 20 scheduled to receive data during this period. In this embodiment, the transmission period is fixed and equal for all SCells. Also shown on FIG. 4 are reception routines 51, 52, 53 and 54 associated with respective reception periods also of equal lengths. For example, during reception routine 51, uplink control data from the user devices 20 is communicated on this channel. As indicated above, the control data is used for maintaining time/frequency synchronization, and for reporting Channel Quality Information/Channel State Information (CQI/CSI) back to the network. The CQI/CSI information is used by the network node to determine if the current radio channel, or one of the other radio channels provide a better channel quality.

As also shown, a next communication cycle 55 starts after the last reception period 54. During the new communication cycle 55, routines as in the first cycle 50 are repeated.

FIG. 5 illustrates an embodiment with transmission routines 41', 42', 44', in a communication cycle 50' and transmission routines 42', 43' and 44' in a subsequent communication cycle 55'. In this embodiment, each transmission period for a respective transmission routine is defined independently cycle by cycle. Furthermore, in the embodiment associated with FIG. 5, a transmission routine 43' for an SCell for which the network node determined that it does not require transmitting in cycle 50', is skipped. Similarly, in the next cycle 55', transmission routine 42' is skipped. Also shown in FIG. 5 are reception routines 51', 52', 53' and 54' associated with respective reception periods. It is to be noted that a reception routine is still present for SCell 43' in cycle 50', and for SCell 42' in cycle 55'. In other embodiments, only one of either one of these two variations may be used to perform multiplexing of the transmitting periods or all SCells before the reception periods.

Figure 6:
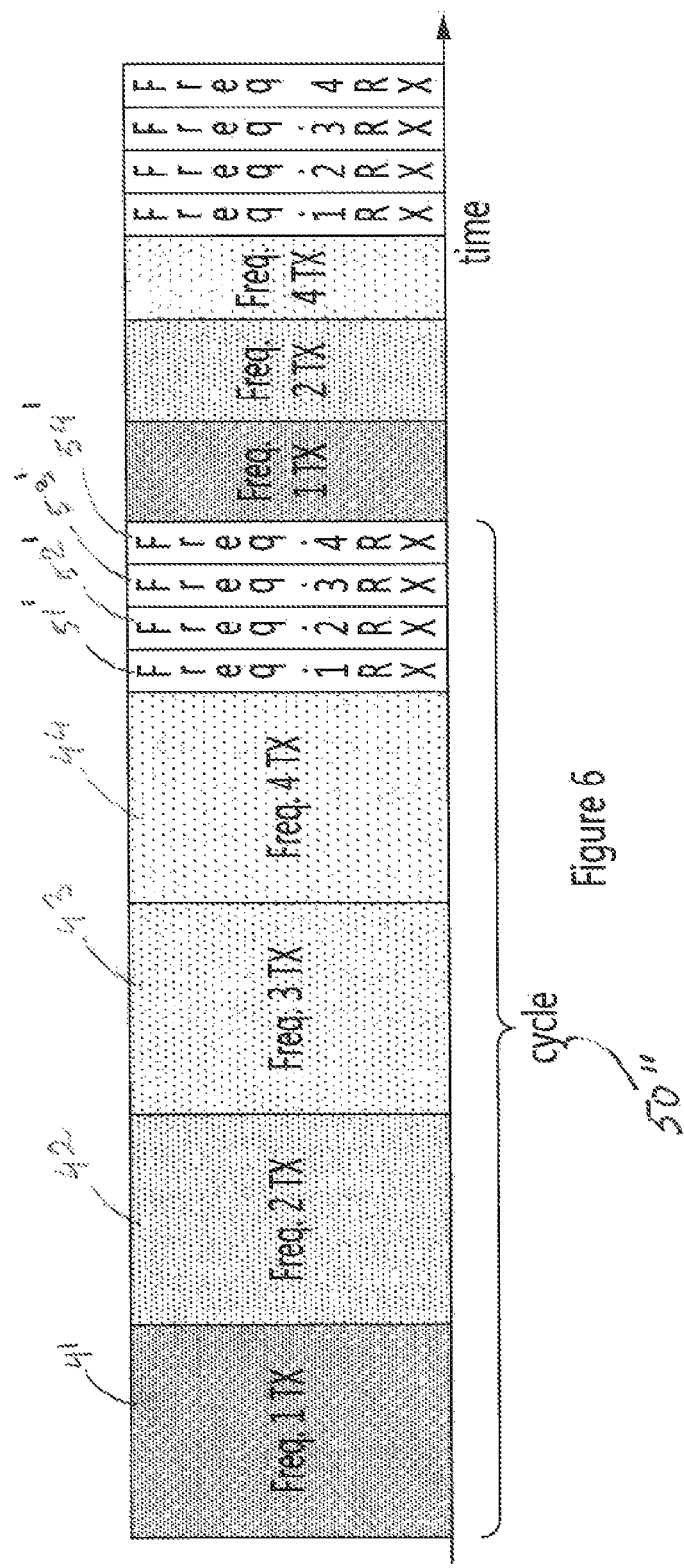
FIG. 6 illustrates a time multiplexing procedure through four SCells, in which within a time multiplexing rotation all SCell reception routines are performed after the SCell transmission routines, according to one embodiment of the present disclosure.

According to still another variant of the transmission cycle, shown in FIG. 6 using reference numeral 50", the transmitting routines 41, 42, 43, and 44 are performed before the reception routines 51', 52', 53' and 54'.

Figure 7:
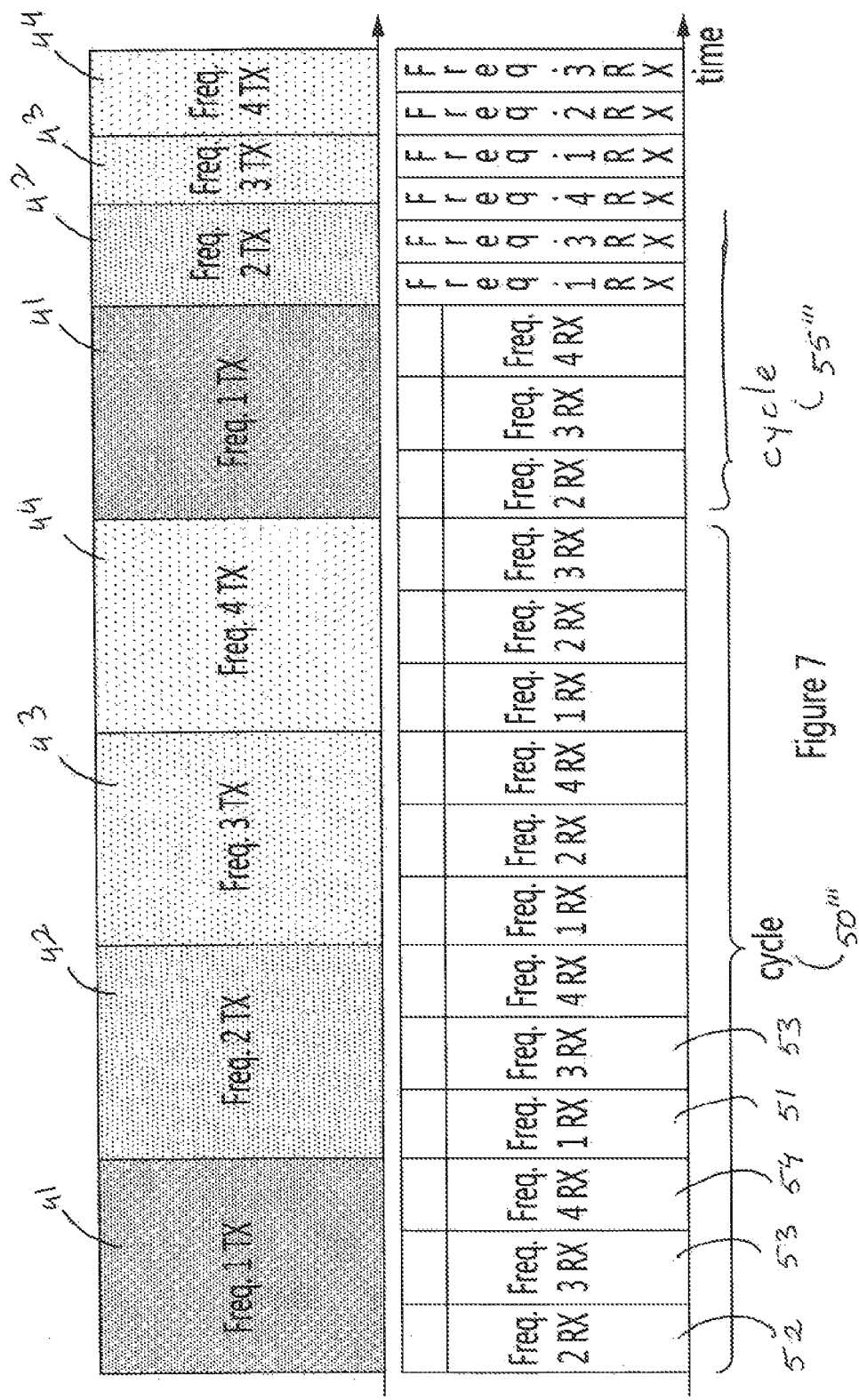
FIG. 7 illustrates a time multiplexing procedure through four SCells, in which the SCell transmissions routines and SCell reception routines are simultaneously performed via two radio units, according to one embodiment of the present disclosure.

Still another variant of the communication cycle is shown at 50'" in FIG. 7. In this embodiment, receptions routines 52, 53, and 54 are performed by, let's say SCell2, SCell3 and SCell4 during transmission routine 41 performed by, let's say, a SCell1. In this embodiment, there is no receiving routine performed by SCell that transmits. For example, there is little value to have Scell1 perform a reception routine when Scell1 is performing transmitting routine 41. In other words, the measurements performed for SCell that transmits may have little value since the receiver will measure the eNBs own transmissions.

As discussed in connection with FIGS. 4-7, the order, duration and periodicity of the SCell transmitting and receiving routines is flexible. Also, with respect to FIGS. 4-7, four carriers embodiments are used as an example, but the number of carriers can be up to any number of carriers supported by the base station.

Figure 8:
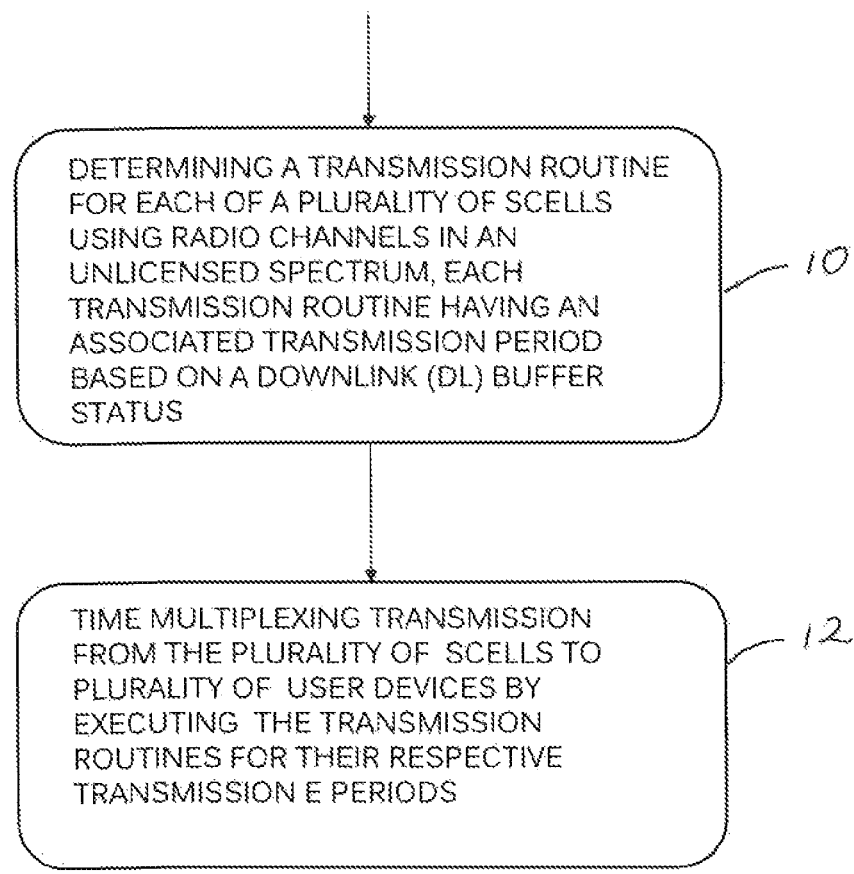
FIG. 8 illustrates a flow chart of an exemplary embodiment of the present disclosure.

FIG. 8 illustrates a flow chart of an exemplary embodiment of the present disclosure, summarizing the operation of a network node. Shown at 10, the network node determines a transmission routine for each of a plurality of SCells, as shown in FIGS. 4-7, using radio channels in the unlicensed spectrum. Each transmission routine is associated with a transmission period established based on a downlink (DL) buffer status.

As shown at 12, the network node time multiplexes transmission and reception from and to the plurality of SCells to a plurality of user devices by controlling execution of the transmission and reception routines during the respective transmission and reception periods.

Figure 9:
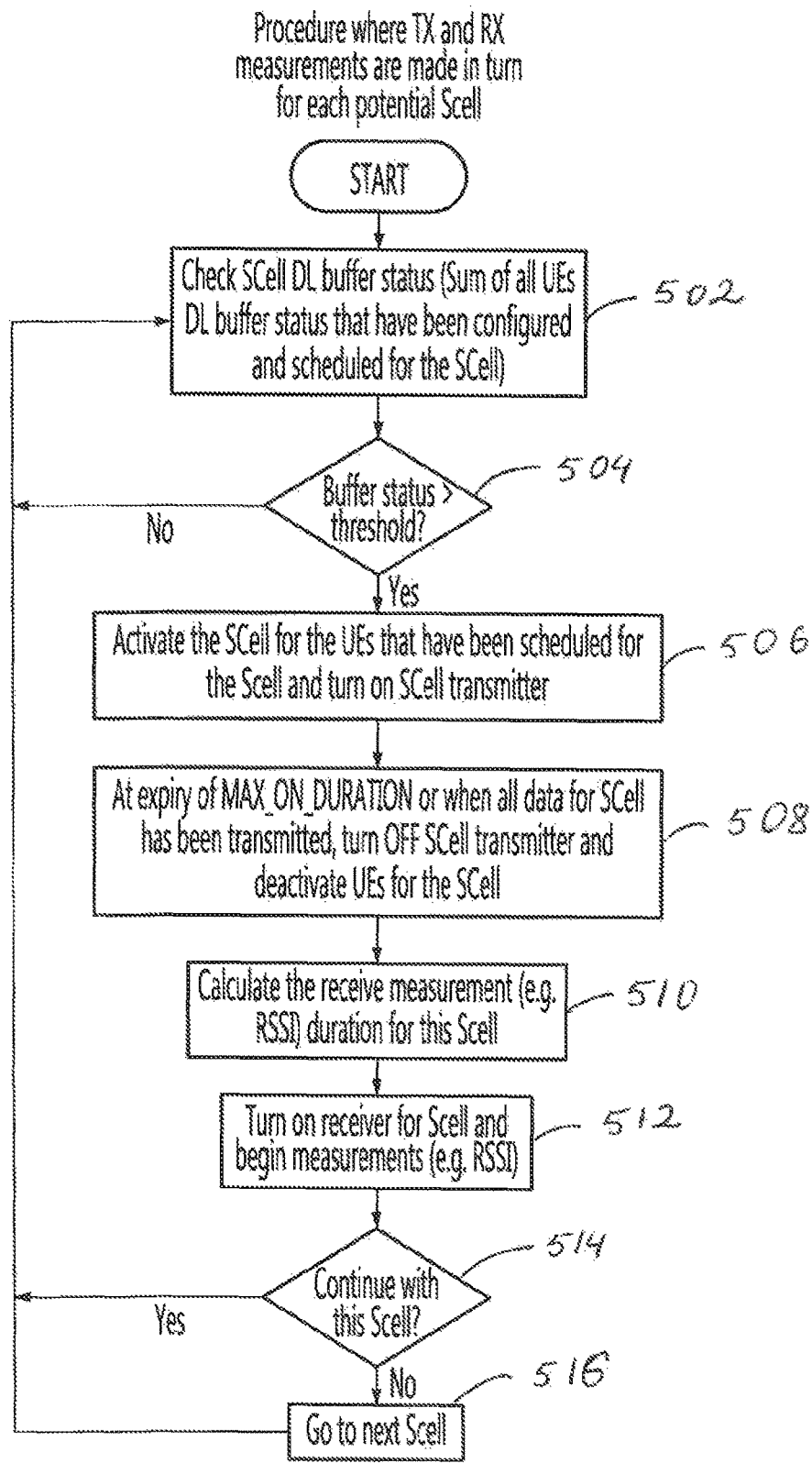
FIG. 9 illustrates a flow chart of an exemplary embodiment of the present disclosure where the transmission routines alternate with reception routines for each SCell.

FIG. 9 illustrates a flow chart of an exemplary embodiment of the present disclosure where the transmission routines alternate with reception routines for each SCell. According to this embodiment, a transmission routine, 41, 42, 43, and 44, for an SCell is followed by a reception routine 51, 52, 53, and 54 for the Scell as shown and described in connection with FIG. 4. Within the transmission routine, the Scell DL buffer status is checked, as shown at 502. The Scell buffer status provides the information about how full the buffer is with data awaiting DL transmission to all user devices that have been configured and scheduled for that Scell. If the data in the buffer exceeds a threshold, as shown by the 'Yes' branch of the decision block 504, the network node activates the SCell, let's say SCell1, for the one or more UEs that have been scheduled for the SCell1 and turn on the Scell1 transmitter, shown at 506.

On the other hand, if the buffer still has room for DL data, i.e. it is under the threshold, as shown by branch 'No' of decision block, the transmission routine for SCell1 is skipped.

At expiry of a MAX_ON_DURATION timer, or when all data for SCell1 has been transmitted, the SCell transmitter is deactivated and the UEs are deactivated or the SCell1, as shown at 508.

The reception routine is next executed, when network node 80 calculates the reception period for this SCell1, shown at 510. The receiver of SCell1 is turned 'on' to receive measurement data from the UEs, which include quality data for the SCell1 radio channel, shown at 512. After the reception routine, a new transmission routine starts, shown by the branch 'No' branch of decision block 514. The method is then repeated for the other SCells, namely SCells2 to 4 of the example of FIG. 4, shown at 516 The new transmission routine may be for the same Scell as previously considered for example if this Scell has a higher priority than others, which could be known in various ways, such as via an operator configuration) or a new Scell in the set of potential Scells.

Figure 10:
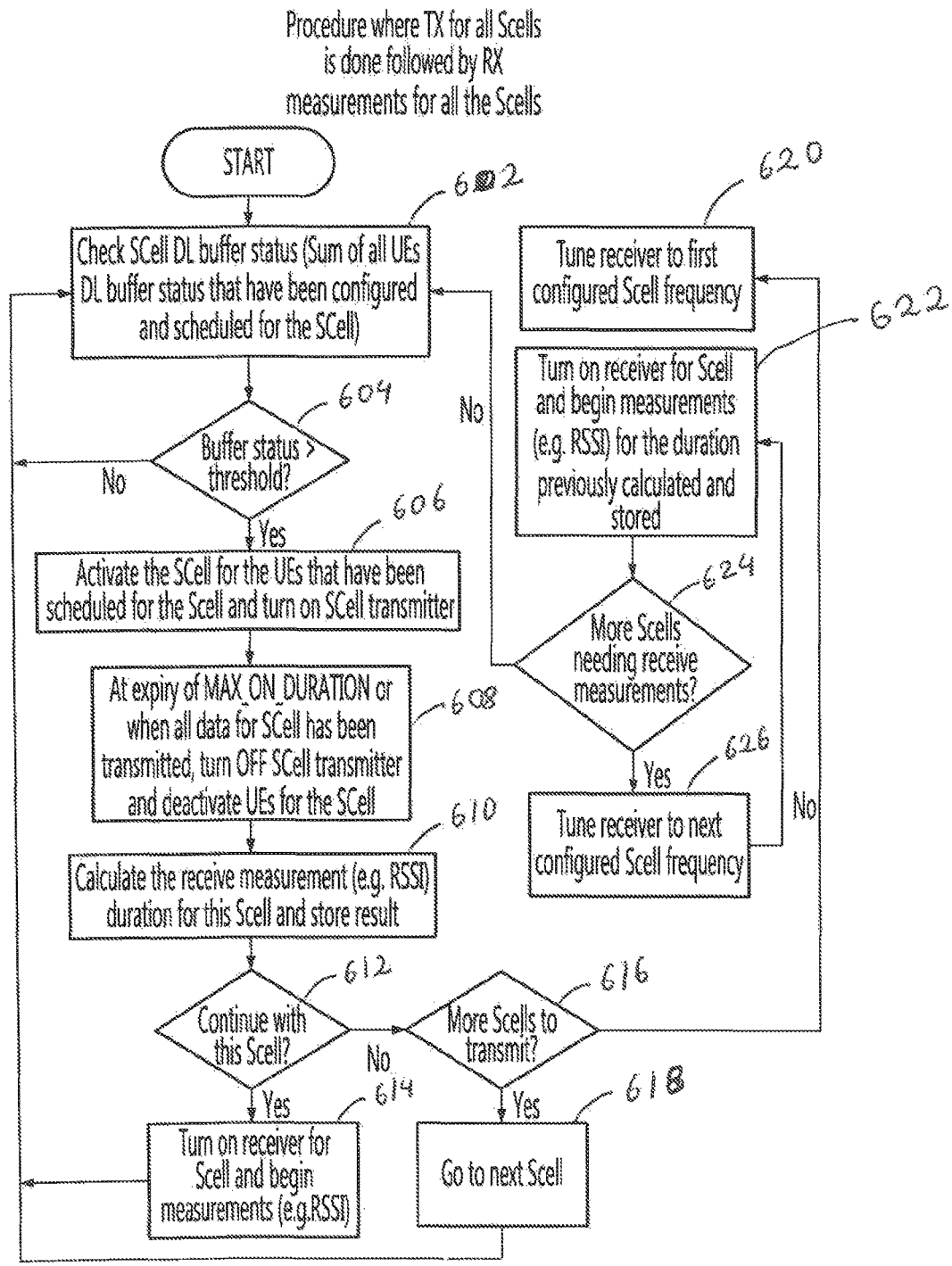
FIG. 10 illustrates a flow chart of another exemplary embodiment of the present disclosure where the transmission routines for all SCells are followed by reception routines.

FIG. 10 illustrates a flow chart of another exemplary embodiment of the present disclosure where the transmission routines for all Sells are followed by reception routines. Functionality shown in FIG. 10 at 602, 604, 606, 608, 610 and 612 is similar to that shown in FIG. 9 at 502, 504, 506 and 508. However, according to this embodiment, in step 610 the measurement duration (reception period) for SCell1 is determined and stored for the duration of the SCell (ScCell1 for example). Next, shown at 612, if there is still data to transmit for this SCell1, the receiver of SCell is turned 'On' to receive the measurements from the UEs, as shown at 614. If more SCells have data to transmit, show at 612 and 616, the receiver is tuned to the first configured SCell frequency, shown at 620 and the receiver begin measurements (e,g, RSSI) for the duration previously calculated at 610 and stored, shown at 622. If more SCells need to receive the measurement, shown by the 'Yes' branch of decision block 624, the receiver is tuned t h next configured SCell, shown at 626. Steps 622-626 are repeated for all configured SCells. If no SCell needs to receive measurements form the UEs, as shown by 'No' branch of block 624, the next communication cycle starts. As seen, in this embodiment, the reception routines are performed after all the transmission routines for all the SCell were performed.

According to the embodiments in FIGS. 9 and 10, but possibly also in conjunction with other described embodiments, in a reception routine, the duration for receive routines is calculated for a Scell and, subsequently, the receiver for this Scell is turned on for this duration, allowing for receive measurements (e.g. (e.g. Receive Signal Strength Indication RSSI)). This can be done for all Scells or only for some Scell. Additionally, this can be done right after a transmission routine for a given Scell, such as in FIG. 9, or after all transmission routines within a rotation are performed, such as in FIG. 10, or another combination.

A set of 'potential' or 'configured' Scells is to be understood herein at least as secondary cells with which the network node has the ability to communicate. Such a set may be further restricted by additional considerations, such as operator configurations, priority of certain Scells over others etc.

Figure 11:
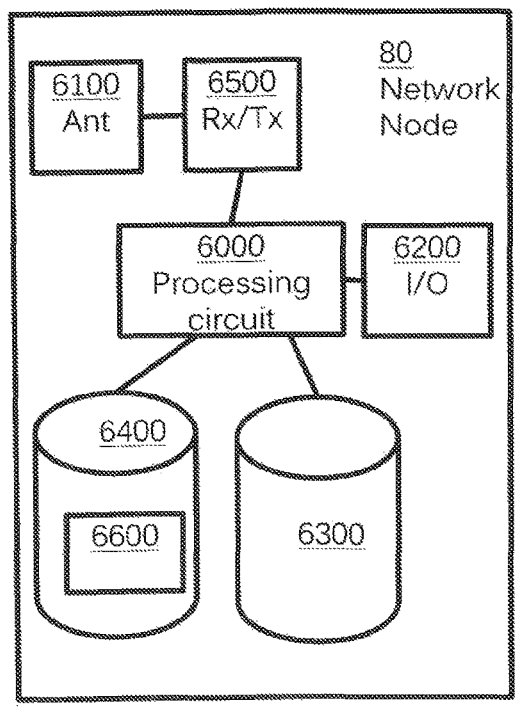
FIG. 11 illustrates one example of an LTE node (e.g., a base station or more generally a radio access node) according to one embodiment of the present disclosure.

FIG. 11 is a schematic diagram illustrating some components of any one of the network nodes described above, here illustrated as a single network node 80. A processing circuit 6000 is provided using any combination of one or more of a suitable central processing unit (CPU), multiprocessor, microcontroller, digital signal processor (DSP), application specific integrated circuit etc., capable of executing software instructions 6600 stored in a computer program product 6400, e.g. in the form of a memory. The processor 6000 may be configured to execute methods and/or procedures described herein, by executing instructions 6600 stored in the computer program product 6400.

The computer program product 6400 may be a memory or any combination of read and write memory (RAM) and read only memory (ROM). The memory also comprises persistent storage, which, for example, may be any single one or combination of magnetic memory, optical memory, solid state memory or even remotely mounted memory.

The network node 80 further comprises a data memory 6300, which comprises persistent and/or volatile memory for storing data, e.g. used by the instructions 6600 when executed by the processor 6000.

The network node 80 further comprises an interface circuit 6200 for communicating with the core network and other network nodes. User interface circuit 6100 is provided for communication with the user devices; this could be antenna circuitry when the user devices are wireless devices.

The network node 80 also comprises one or more transceivers 6500, comprising analogue and digital components, and a suitable number of antennas 6100 for radio communication with user devices within one or more radio cells. The processor 6000 controls the general operation of the radio network node 80, e.g. by sending control signals to the transceiver 6500 and receiving reports from the transceiver 6500 of its operation.

Other components of the network node 580 are omitted in order not to obscure the concepts presented herein.

Figure 12:
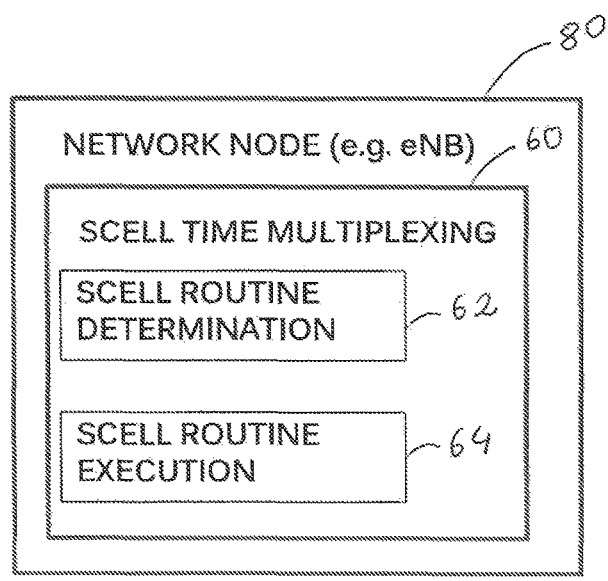
FIG. 12 illustrates another example of an LTE node (e.g., a base station or more generally a radio access node), according to one embodiment of the present disclosure.

FIG. 12 illustrates an example of another embodiment of a network node 80 that implement methods as described herein. As illustrated, the network node 80 includes an SCell time multiplexing module 60. The SCell time multiplexing module 60 comprises an SCell routine determination module 62 and an SCell routine execution module 64. All modules may be implemented in software. The SCell time multiplexing module 60 operates to time multiplex communications with SCells as described above. The SCell routine determination module 62 operates to determine transmission and reception routines as described above. The SCell routine execution module 64 operates to control execution of the transmission and reception routines as described above. SCell time multiplexing module 60 may comprise additional modules operating as described above.

Some embodiments of the present disclosure may allow a single FDD or TDD radio unit to operate multiple LAA-LTE SCell carriers. Such operation may be transparent to the UE and other network elements. Furthermore, a greater level of performance for LAA-LTE nodes may be provided by allowing SCell channel selection to be done "per UE" rather than "per eNB".

Some of the following acronyms are used throughout this disclosure.

3GPP $3^{rd}$ Generation Partnership Project
ASIC Application Specific Integrated Circuit
CA Carrier Aggregation
CPU Central Processing Unit
CQI Channel Quality Information
DTX Discontinuous Transmission
eNB Enhanced or Evolved Node B
FDD Frequency Division Duplexing
FDMA Frequency Division Multiple Access
FPGA Field Programmable Gate Array
ISM Industrial, Scientific and Medical
LAA Licensed Assisted Access
LA-LTE Licensed Access Long Term Evolution
LTE Long Term Evolution
LTE Rel-8 Long Term Evolution Release 8
LTE Rel-10 Long Term Evolution Release 10
LTE-U Long Term Evolution Unlicensed
MAC Medium Access Control
MHz Megahertz
ms Millisecond
PCell Primary Cell
RRC Radio Resource Control
RRH Remote Radio Head
RSSI Receive Signal Strength Indication
SCell Secondary Cell
TDD Time Division Duplexing
UE User Equipment
UNII Unlicensed National Information Infrastructure Those skilled in the art will recognize improvements and modifications to the aspects and embodiments of the present disclosure. All such improvements and modifications are considered within the scope of the concepts disclosed herein.

What is claimed is:

1. A method implemented by a network node of a cellular communication network, serving a plurality of user devices, the method comprising:
   determining a downlink (DL) buffer status for each of a plurality of secondary cells (SCells);
   determining a transmission routine for each of the plurality of SCells, using radio channels in an unlicensed spectrum, each transmission routine having an associated transmission period, based on the respective downlink (DL) buffer status; and
   time multiplexing transmission from the plurality of SCells to the plurality of user devices by executing the transmission routines during their respective transmission periods.

2. The method of claim 1, wherein a communication cycle includes a sequence of the transmission routines for the plurality of SCells.

3. The method of claim 2, further comprising executing additional communication cycles based on the downlink buffer status.

4. The method of claim 3, wherein the associated transmission period for an SCell may change in a subsequent communication cycle.

5. The method of claim 2, wherein, within a communication cycle, all SCell reception routines are performed after all transmission routines.

6. The method of claim 1, wherein each transmission periods ranges from zero to a maximum value, MAX_TX.

7. The method of claim 1, further comprising:
   determining a reception routine for each one of the plurality of SCells, each reception routine having an associated reception period; and
   time multiplexing reception of data from the plurality of user devices to the plurality of SCells by executing the reception routines for their respective reception periods.

8. The method of claim 7, wherein each one of the reception periods are above a minimum value, MIN_RX.

9. The method of claim 7, wherein the reception routine of a given SCell is performed after the transmission routine for the given SCell.

10. The method of claim 1, further comprising:
    selecting a radio channel for use by based on channel quality measurements obtained from the plurality of user devices;
    activating the SCell during the associated transmission period of a communication cycle; and
    deactivating the SCell during a remainder time of the communication cycle.

11. The method of claim 10, wherein the radio channel is used for communication between the SCell and at least one user device selected from the plurality of user devices based on channel quality measurements.

12. A network node within a cellular communication network, the network node comprising:
    a user interface circuit, for communicating with at least one user device; and
    a processing circuit, the processing circuit configured to:
       determine a downlink (DL) buffer status for each of a plurality of secondary cells (SCells);
       determine a transmission routine for each of the plurality of SCells, using radio channels in an unlicensed spectrum, each transmission routine having an associated transmission period, based on the respective downlink (DL) buffer status; and
       time multiplex transmission from the plurality of SCells to a plurality of the at least one user device by executing the transmission routines for their respective transmission periods.

13. The network node of claim 12, wherein a communication cycle includes a sequence of the transmission routines for the plurality of SCells.

14. The network node of claim 13, wherein the processing circuit is further configured to execute additional communication cycles based on the downlink buffer status.

15. The network node of claim 14, wherein the associated transmission period for an SCell can change in a subsequent communication cycle.

16. The network node of claim 13, wherein, within a communication cycle, all SCell reception routines are performed after all transmission routines.

17. The network node of claim 12, wherein each transmission periods ranges from zero to a maximum value, MAX_TX.

18. The network node of claim 12, wherein the processing circuit is further configured to:
  determine a reception routine for each one of the plurality of SCells, each reception routine having an associated reception period; and
  time multiplex reception of data from the plurality of user devices to the plurality of SCells by executing the reception routines for their respective reception periods.

19. The network node of claim 18, wherein each one of the reception periods are above a minimum value, MIN_RX.

20. The network node of claim 18, wherein the reception routine of a given SCell is performed after the transmission routine for the given SCell.

21. The network node of claim 12, wherein the processing circuit is further configured to:
  select a radio channel for use by based on channel quality measurements obtained from the plurality of user devices;
  activate the SCell during the associated transmission period of a communication cycle; and
  deactivate the SCell during a remainder time of the communication cycle.

22. The network node of claim 21, wherein the radio channel is used for communication between the SCell and at least one user device selected from the plurality of user devices based on channel quality measurements.

23. An apparatus, configured to:
  determine a downlink (DL) buffer status for each of a plurality of secondary cells (SCells);
  determine a transmission routine for each of the plurality of SCells, using radio channels in an unlicensed spectrum, each transmission routine having an associated transmission period, based on the respective downlink (DL) buffer status; and
  time multiplex transmission from the plurality of SCells to a plurality of user devices by executing the transmission routines for their respective transmission periods.

24. A non-transitory computer-readable storage medium containing a computer program comprising executable instructions that, when executed by a processing circuit in a network node causes the network node to perform a method comprising:
  determining a downlink (DL) buffer status for each of a plurality of secondary cells (SCells);
  determining a transmission routine for each of the plurality of SCells, using radio channels in an unlicensed spectrum, each transmission routine having an associated transmission period, based on the respective downlink (DL) buffer status; and
  time multiplexing transmission from the plurality of SCells to the plurality of user devices by executing the transmission routines during their respective transmission periods.

* * * * *